US006968009B1

(12) United States Patent  
Straasheijm

(10) Patent No.: US 6,968,009 B1  
(45) Date of Patent: Nov. 22, 2005

(54) SYSTEM AND METHOD OF FINDING MOTION VECTORS IN MPEG-2 VIDEO USING MOTION ESTIMATION ALGORITHM WHICH EMPLOYS SCALED FRAMES

(75) Inventor: Pieter Straasheijm, Karlsruhe (DE)

(73) Assignee: STMicroelectronics, Inc., Carrollton, TX (US)

( * ) Notice: Subject to any disclaimer, the term of this patent is extended or adjusted under 35 U.S.C. 154(b) by 687 days.

(21) Appl. No.: 09/708,341

(22) Filed: Nov. 8, 2000

Related U.S. Application Data

(60) Provisional application No. 60/165,009, filed on Nov. 12, 1999.

(51) Int. Cl.⁷ .......................... H04N 7/12; H04N 11/02
(52) U.S. Cl. ............................. 375/240.16; 375/204.21
(58) Field of Search ..................... 375/240.16, 240.17, 375/240.13, 240.21; 348/699.1

(56) References Cited

U.S. PATENT DOCUMENTS

| 5,477,272 A | * | 12/1995 | Zhang et al. | .......... 375/240.06 |
| 5,485,210 A | * | 1/1996 | Lim et al. | .............. 375/240.16 |
| 5,576,772 A | * | 11/1996 | Kondo | ........................ 348/699 |
| 5,731,850 A | * | 3/1998 | Maturi et al. | ................ 348/699 |
| 6,084,909 A |  | 7/2000 | Chiang et al. |  |
| 6,219,383 B1 | * | 4/2001 | Park | ....................... 375/240.16 |
| 6,430,222 B1 | * | 8/2002 | Okada | ................... 375/240.03 |
| 6,549,575 B1 | * | 4/2003 | Butter et al. | ........... 375/240.16 |
| 6,560,371 B1 | * | 5/2003 | Song et al. | ................. 382/240 |

* cited by examiner

*Primary Examiner*—Gims Philippe  
*Assistant Examiner*—Erick Rekstad  
(74) *Attorney, Agent, or Firm*—Lisa K. Jorgenson; Louis Sickles, II

(57) ABSTRACT

A method of finding motion vectors for use in MPEG video encoding comprises generating, from a full frame, (i) a first scaled frame having a reduced number of pixels as compared to the full frame and (ii) a second scaled frame having a reduced number of pixels as compared to the first scaled frame. A first, full, best match search is of the second scaled frame is performed to identify rough motion vectors. A second best match search is performed using the rough motion vectors identified by the first search within a limited range in the X and Y directions for each macroblock of the first scaled frame to identify intermediate motion vectors. Finally, a third best match search is performed using the intermediate motion vectors identified by the second search, within a limited range in the X and Y directions for each macroblock of the full frame to identify final motion vectors.

10 Claims, 4 Drawing Sheets

$(P0 + P1 + P2 + P3)/4$

SCALING ALGORITHM FOR
INTEGER PIXELS

FIG. 3A $(P0 + P1 + P2 + P3 + .5)/4$

SCALING ALGORITHM FOR
INTEGER PIXELS

FIG. 3B

FINE SEARCH ON FULL FRAME

FINE SEARCH ON HALF-SCALED FRAME

SYSTEM AND METHOD OF FINDING MOTION VECTORS IN MPEG-2 VIDEO USING MOTION ESTIMATION ALGORITHM WHICH EMPLOYS SCALED FRAMES

CROSS-REFERENCE TO RELATED APPLICATIONS

The present application claims the benefit of U.S. Provisional Patent Application No. 60/165,009 filed Nov. 12, 1999 and entitled, "System And Method Of Finding Motion Vectors In MPEG-2 Video Using Motion Estimation Algorithm Which Employs Scaled Frames".

BACKGROUND OF THE INVENTION

MPEG-2 is a conventional standard for digital video compression. MPEG-2 is based upon interframe compression. The theory behind interframe compression is that in most video scenes, the background remains relatively stable while actions takes place in the foreground. Thus, even if the background moves, most of the video information from scene to scene (on a frame by frame basis) is redundant.

The MPEG video compression algorithm employs two basic techniques, namely, block-based motion compensation for the reduction of temporal redundancy, and transform domain (DCT) coding for the reduction of spatial redundancy. The motion compensation technique is employed in the forward (causal) and backward (non-causal) direction. The remaining signal (prediction error) is coded using the transform-based technique. The motion predictors, called motion vectors, are transmitted together with the spatial information.

To understand temporal redundancy reduction, it is necessary to understand an MPEG video stream. There are three types of picture frames in an MPEG-2 video stream, namely, I frames (also referred to as "Intra" frames or reference frames), P (predicted) frames, and B (bi-directional interpolated) frames. The relationship between the frames is shown in FIG. 1.

To clarify terminology used herein, MPEG-2 refers to a "picture" as either a frame or a field. Therefore, a coded representation of a picture may be reconstructed to a frame or a field. During the encoding process, the encoder may code a frame as one frame picture or two field pictures. If the frame is encoded as field pictures, each field is coded independently of each other. That is, two fields are coded as if they were two different pictures wherein each picture has one-half of the vertical size of a frame. The discussion below interchangeably refers to pictures and frames.

MPEG-2 starts the compression process by creating an I frame or reference frame. The I frames contain the entire frame of video and are placed every 10 or 15 frames. Only a small portion of the frames that fall between the I frames is different from the rest of the I frames. Only these differences are captured, compressed and stored. I frames provide entry points into a video file to allow for random access. I frames can only be moderately compressed.

P frames are encoded with reference to a past frame, which can be either an I or P frame. Generally, P frames are used as a reference to future P frames. P frames are highly compressed.

B frames are encoded with reference to a past and future frame. B frames are the most highly compressed of the three types of frames. B frames are never used as the references. There is no limit to the number of B frames allowed between the two references, or the number of frames between two I frames.

Motion compensation prediction assumes that the current picture can be locally modeled as a translation of the pictures of some previous time. According to the MPEG standard, the reference picture is divided into a grid of 16×16 pixel squares called macroblocks. Each subsequent picture is also divided into these same macroblocks. A computer then searches for an exact, or near exact, match between the reference picture macroblock and those in succeeding pictures. When a match is found, the computer transmits only the difference through a "vector movement code" or "motion vector." Stated simply, the motion vector tells us where the macroblock moved to from its original position. The macroblocks that did not change are ignored. Thus, only the non-zero motion vectors are subsequently "coded." Accordingly, the amount of data that is actually compressed and stored is significantly reduced.

The MPEG syntax specifies how to represent motion information for each macroblock, but does not specify how the motion vectors must be computed. Many conventional motion vector computation schemes use block-matching. In block-matching, the motion vector is obtained by minimizing a cost function which measures the mismatch between the reference block and the current block. One widely used cost function is the absolute difference (AE) defined as:

$$AE(d_x, d_y) = \sum_{i=0}^{15} \sum_{j=0}^{15} |f(i, j) - g(i - d_x, j - d_y)|$$

wherein f(i,j) represents a macroblock of 16×16 pixels from the current picture, and g(i,j) represents the same macroblock from a reference picture. The reference macroblock is displaced by a vector $(d_x, d_y)$, representing the search location.

To find the best matching macroblock which produces the minimum mismatch error, the AE is calculated at several locations in the search range. The conceptually simplest, but the most computer-intensive search method, is known as the "full search" or "exhaustive search." This search evaluates the AE at every possible pixel location in the search area. Less computationally complex algorithms may also be used. One conventional algorithm is the Three-Step-Search (TSS). This algorithm first evaluates the AE at the center and eight surrounding locations of a 32×32 search area. The location that produces the smallest AE then becomes the center of the next stage, and the search range is reduced by half. This sequence is repeated three times. The TSS skips a lot of pixels, and thus does not always accurately locate the best matching macroblock.

After motion compensation is completed, spatial redundancy reduction is performed using DCT to obtain quantized DCT coefficients. Then, entropy coding is performed on quantized DCT coefficients.

As discussed above, conventional schemes for finding motion vectors during motion compensation are either very computationally intensive (e.g., full search) or suffer from accuracy problems (e.g., Three-Step-Search). Accordingly, there is a need for a motion estimation algorithm which is less computationally intensive than a full search, but which does not suffer from accuracy problems. The present invention fulfills such a need.

BRIEF SUMMARY OF THE INVENTION

Briefly stated, the present invention comprises a method a finding motion vectors for use in MPEG video encoding. The method comprises the steps of generating, from a full frame, (i) a first scaled frame having a reduced number of pixels as compared to the full frame, and (ii) a second scaled frame having a reduced number of pixels as compared to the first scaled frame. In a preferred embodiment, the first scaled frame is a one-half scaled frame having one-fourth of the number of pixels as a full frame and the second scaled frame is a one-fourth scaled frame having one-sixteenth of the number of pixels of a full frame. A first, full, best match search is performed of the second scaled frame to identify rough motion vectors. A second best match search is performed using the rough motion vectors identified by the first search within a limited range in the X and Y directions for each macroblock of the first scaled frame to identify intermediate motion vectors. Finally, a third best match search is performed using the intermediate motion vectors identified by the second search, in a limited range in the X and Y directions for each macroblock of the full frame to identify final motion vectors. In a preferred embodiment, a fourth, best match search is performed using the final motion vectors within a limited range in the X and Y directions of −0.5, 0 and +0.5 pixels of a virtual frame formed by averaging a reference macroblock and a pixel shifted macroblock.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIGS. 3A and 3B show scaling algorithms for making the one-half scaled frames and one-quarter scaled frames;

DETAILED DESCRIPTION OF THE INVENTION

Certain terminology is used herein for convenience only and is not to be taken as a limitation on the present invention.

Figure 1:
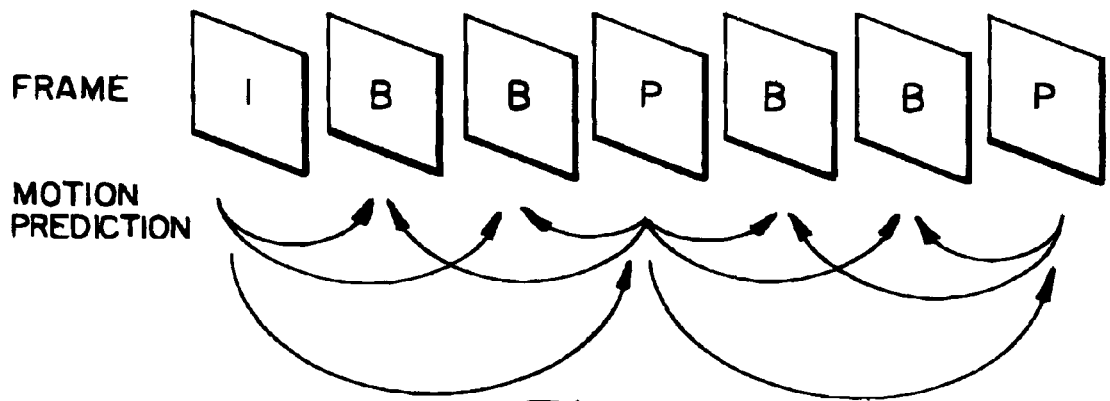
FIG. 1 shows the relationship in motion prediction between I, P and B frames.
Figure 2:
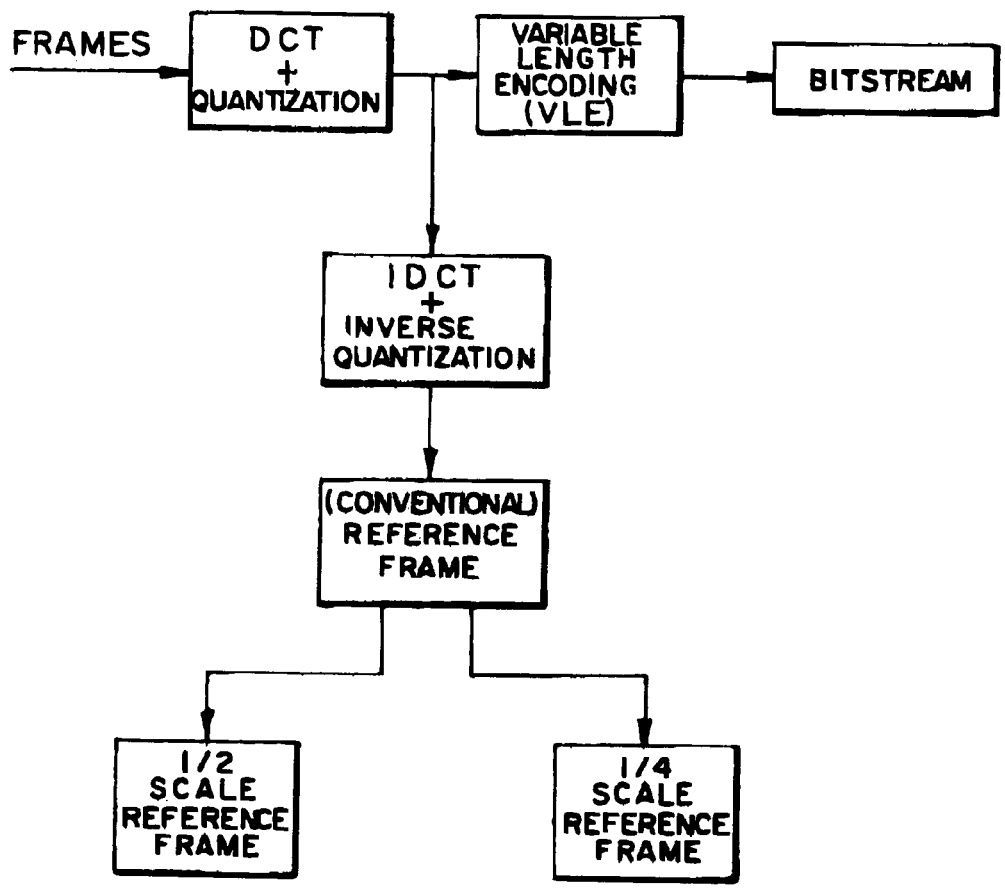
FIG. 2 is a schematic block diagram showing how one-half scaled frames and one-quarter scaled frames are created.

The present invention is based on the concept of using scaled frames, in addition to full frames, for block-matching during motion estimation. That is, best-match searches are performed on scaled frames. The scaled frames are supplied by inverse DCT routines so as to reduce cache misses. One preferred embodiment uses a full reference frame, as well as a half-scaled frame and quarter-scaled frame formed from the full reference frame as shown in FIG. 2. The half-scaled frame has ¼ of the number of pixels, whereas the quarter-scaled frame has 1/16 of the pixels.

FIGS. 3A and 3B show suitable scaling algorithms for integer pixels and floating point pixels, respectively.

One preferred motion estimation algorithm is a two-step process which uses the full frame, a half-scaled frame and a quarter-scaled frame, as follows:

STEP 0: Generate one-half scaled and one-fourth scaled frames.

STEP 1: Perform a rough search to find rough motion vectors.

This step is performed before the frame is encoded. The motion vectors are searched in the quarter-scaled frame and with four macroblocks at each search. This provides roughly searched motion vectors for the frame. Since big objects in scenes usually move in the same direction, the four macroblock search provides accurate vector information for the rough search.

The rough search provides two major advantages, apart from its use in the motion estimation algorithm. First, few or no matches are found whenever there are scene changes. This fact may be used for scene change detection. If a scene change is detected, then the P frame is not coded and a new I frame is sent.

The second advantage relates to the Inverse Telecine process. In the Telecine Process, a video master is created from a film master and includes the step up from 24 film frames per second (fps) to 30 NTSC video fps (technically, 29.97 fps). The Inverse Telecine process retraces back to 24 fps to reduce the amount of digital compression work needed. There are four NTSC fields with motion and one still field. The rough search identifies the smallest average motion vector. In this manner, the rough search can be used to find the still frame and cause appropriate circuitry to delete it.

To reduce cache misses, the rough search is preferably executed upside down. In this manner, most of the frames are still in cache after the search is completed.

STEP 2: Perform fine search to find motion vectors.

This step is performed before each macroblock is encoded. The fine search is performed in two substeps, as follows:

(i) A search is conducted in the half-scaled frame with the offset found in the rough search. This search is conducted in a limited range of −1, 0, +1 pixels in the X and Y direction of the half-scaled frame. This conforms to the range of −2, 0, +2 pixels in the full frame. This search is performed for every macroblock.

(ii) A search is conducted in the fill frame in a range from −1, 0, +1 pixels with the offset found in step (i).

Optionally, a half pixel search may be added as STEP 3. To perform this search, a virtual reference frame is made by averaging two macroblocks, a reference block and a pixel shifted block. A search is then conducted in a limited range of −0.5, 0, +0.5 pixels in the X and Y direction of the full frame.

After completion of these steps, spatial redundancy reduction and entropy coding is performed on the full frames in the conventional manner.

The overall process may thus be viewed as having the following steps:

(A) Code an I frame.

(B) Make a half-scaled and quarter-scaled reference frame of the I frame.

(C) Perform STEPS 1 and 2 (and optional STEP 3) above to code B and P frames. To perform STEP (C), half-scaled frames and quarter-scaled frames of each I and P frame are made on the fly.

In the present invention, a full search is performed on the quarter-scaled frames. Since the quarter-scaled frames have 1/16 of the pixels of a full frame, a full search can be performed with a proportionally reduced amount (e.g., 1/16) of data processing. The combination of the rough search and fine search provides accuracy similar to the conventional full search of the full frame and still results in a reduction in overall processing, even when the additional processing of the fine search is considered.

Figure 4B:
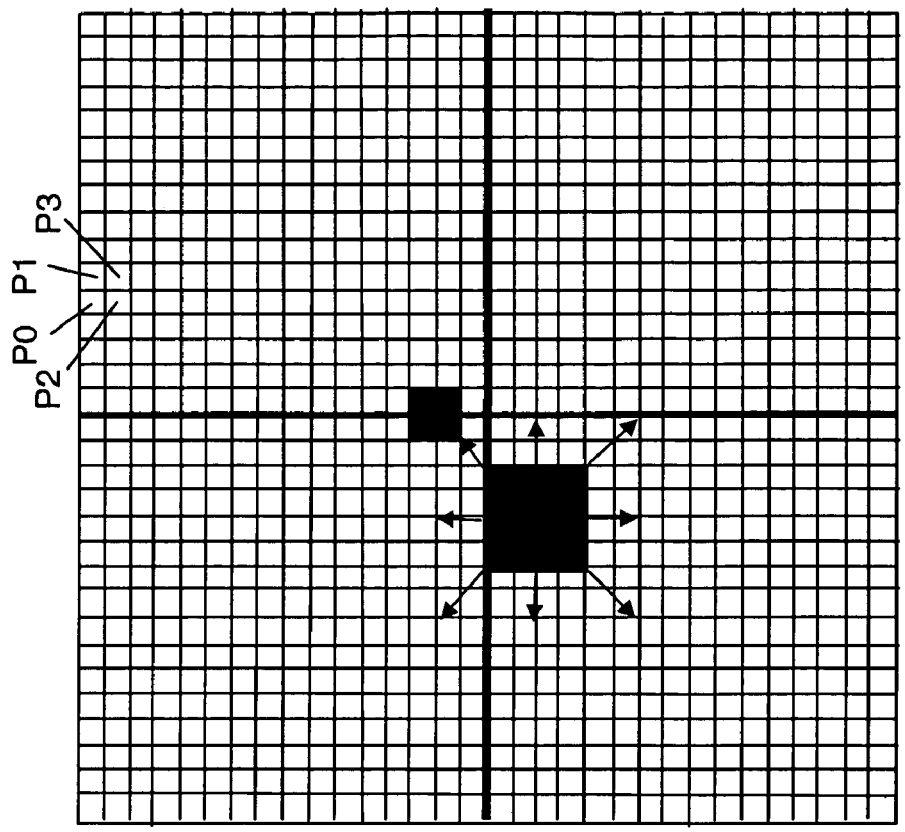
FIGS. 4A and 4B show two steps of the motion detection algorithm.
Figure 4A:
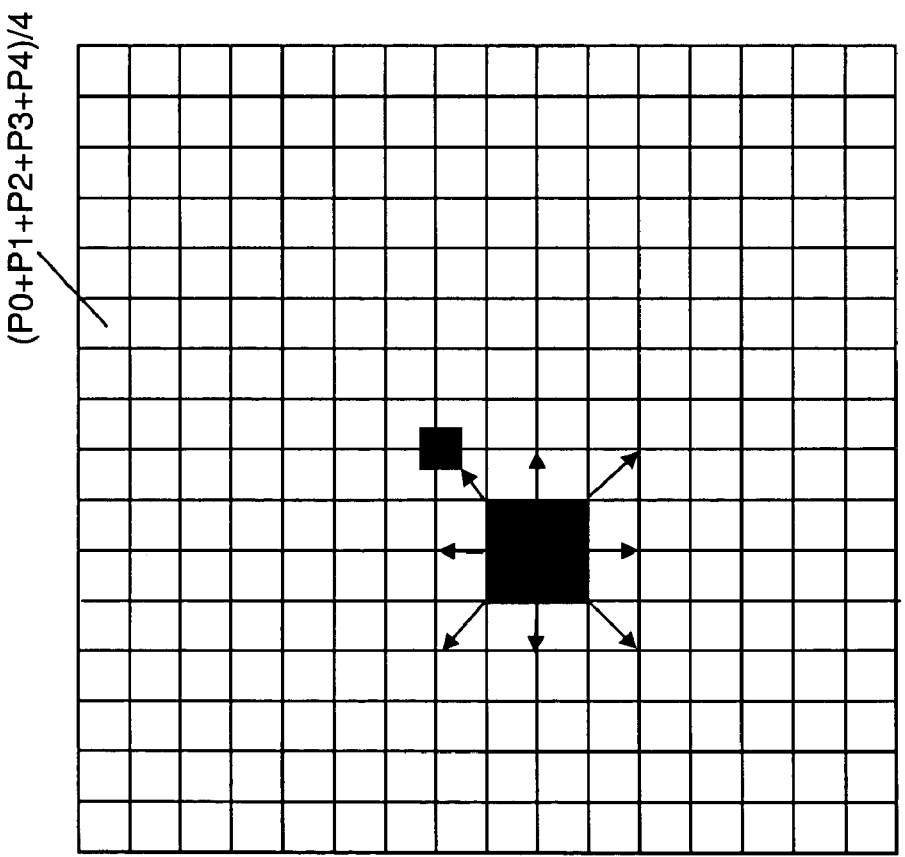
Figure 5:
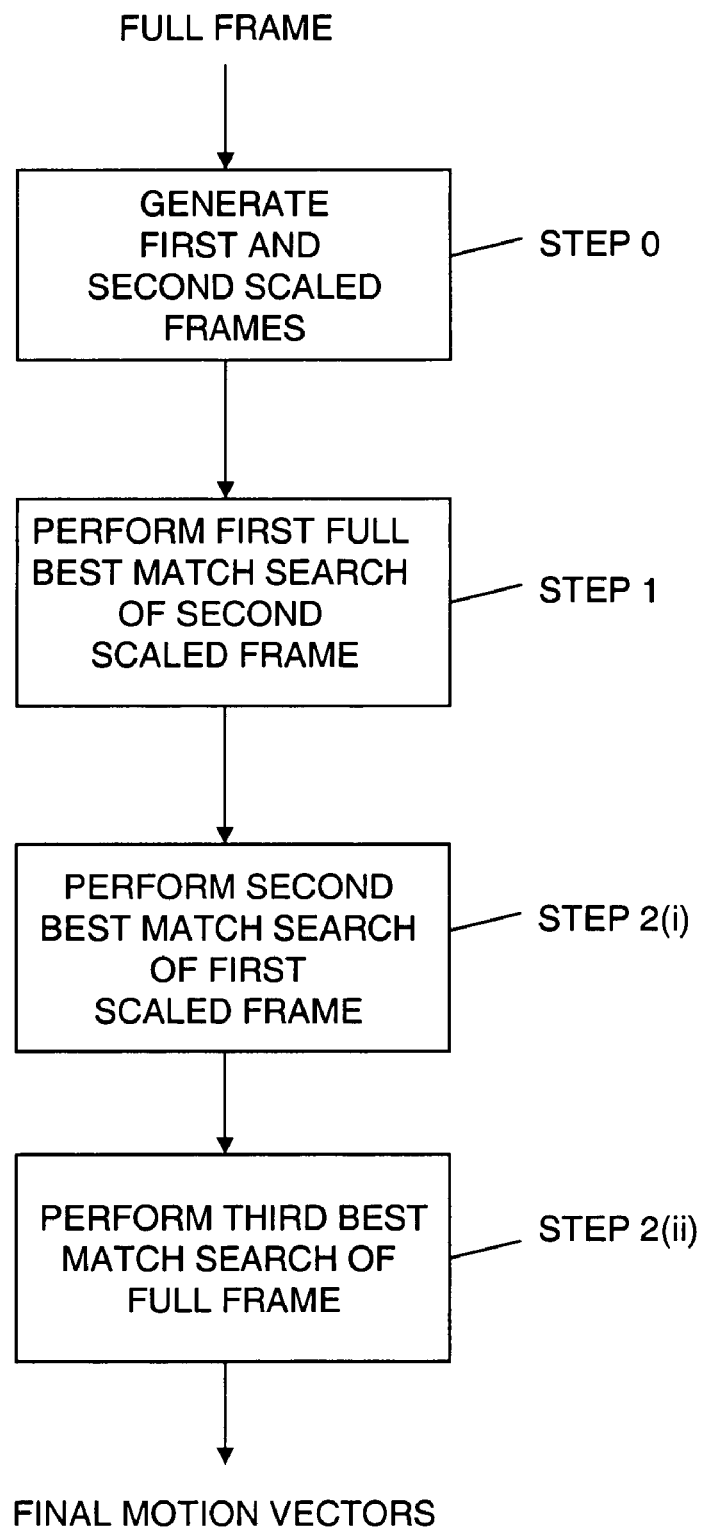
FIG. 5 shows the steps for obtaining motion vectors.

To further explain the invention concept, FIGS. 4A and 4B show a simplified and exaggerated illustration of how a sample motion vector is treated. In this example, the process of STEP 1 located a motion vector of four macroblocks having a value of (4,4) which represents x,y vector movement. Since this motion vector is for a quarter-scaled frame, the equivalent motion vector in the half-scaled frame is (8,8).

FIG. 4A shows a half-scaled frame. STEP (2)(i) is performed and provides motion vector (7,8) as the best match. This result indicates that the rough search was almost right, but not exactly right due to inherent resolution limitations.

FIG. 4B shows a full frame. STEP (2)(ii) is performed and provides motion vector (14,16) as the best match. This result confirms that STEP (2)(i) found the best match. If motion vectors such as (13,16), (14,17) or (13,15) were found to be the best match, this would have indicated that the fine search of the half-scaled frame was almost right, but not exactly right due to inherent resolution limitations.

The present invention may be implemented with any combination of hardware and software. In one preferred embodiment, the motion estimation algorithm may be implemented entirely in software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of finding motion vectors for use in MPEG video encoding, the method comprising:

generating from a full frame, (i) a first scaled frame having a reduced number of pixels as compared to the full frame and (ii) a second scaled frame having a reduced number of pixels as compared to the first scaled frame;

defining a size of a macroblock in the full frame;

performing a first, full, best match search of the second scaled frame to identify rough motion vectors, the first search using reference blocks consisting of four scaled macroblocks of the second scaled frame;

performing a second best match search using the rough motion vectors identified by the first search, within a limited range in the X and Y directions for each scaled macroblock of the first scaled frame to identify intermediate motion vectors; and performing a third best match search using the intermediate motion vectors identified by the second search, within a limited range in the X and Y directions for each macroblock of the full frame to identify final motion vectors.

2. The method of claim 1, further comprising:

using the results of the first search to identify a scene change and obtain a new reference frame.

3. The method as recited in claim 1 further comprising:

using the results of the first search to identify a still frame which can be deleted.

4. The method as recited in claim 1 wherein the scaled frames are generated using the result of an inverse discreet cosine transform process.

5. The method as recited in claim 1 wherein the limited range of the second search is −1, 0, +1 pixels.

6. The method as recited in claim 1 wherein the limited range of the third search is −1, 0, +1 pixels.

7. The method as recited in claim 1 further comprising:

performing a fourth best match search using the final motion vectors within a limited range in the X and Y directions of −0.5, 0, +0.5 pixels of a virtual frame formed by averaging a reference macroblock and a pixel shifted macroblock.

8. The method as recited in claim 1 wherein the first scaled frame is a one-half scaled frame having one-fourth of the number of pixels as a full frame.

9. The method as recited in claim 1 wherein the second scaled frame is a one-fourth scaled frame having one sixteenth of the number of pixels of a full frame.

10. The method as recited in claim 1 wherein the full frame is an I frame.

* * * * *